United States Patent [19]
Winterling et al.

[11] 4,149,118
[45] Apr. 10, 1979

[54] ELECTRONIC CONTROL AND REGULATION SYSTEM

[75] Inventors: Gerhard Winterling, Magstadt; Norbert Bissinger, Faurndau, both of Fed. Rep. of Germany

[73] Assignee: Max Planck Gesellschaft zur Forderung der Wissenschaften, e.V., Göttingen, Fed. Rep. of Germany

[21] Appl. No.: 778,988

[22] Filed: Mar. 18, 1977

[30] Foreign Application Priority Data

Mar. 20, 1976 [DE] Fed. Rep. of Germany ....... 2612012

[51] Int. Cl.$^2$ .............................................. G05B 1/06
[52] U.S. Cl. ..................... 318/640; 318/648; 318/649; 356/363; 356/352
[58] Field of Search ............... 318/575, 640, 648, 649; 356/106 LR, 110, 112

[56] References Cited

U.S. PATENT DOCUMENTS

| 3,567,325 | 3/1971 | Tibbals, Jr. | 356/112 |
| 3,729,261 | 4/1973 | Sandercock | 356/112 |
| 3,786,332 | 1/1974 | Hepner et al. | 318/640 |
| 3,788,743 | 1/1974 | George | 356/112 |
| 3,795,448 | 3/1974 | Fletcher et al. | 356/112 |
| 3,977,788 | 8/1976 | Moore | 356/112 |
| 4,019,109 | 4/1977 | McCoy et al. | 318/640 |

FOREIGN PATENT DOCUMENTS 2313107  2/1975  Fed. Rep. of Germany.

Primary Examiner—Robert K. Schaefer
Assistant Examiner—Eugene S. Indyk
Attorney, Agent, or Firm—Flynn & Frishauf

[57] ABSTRACT

A reflector of an optical system has its position controlled by piezoelectric devices operating at three points of the reflector disposed at the apices of an equilateral triangle. These are driven by summing amplifiers each of which has an input to which a signal for producing displacement of the reflector without change of tilt is provided and one or more inputs connected to the output of a matrix circuit responsive to signals for producing tilt of the reflector about two mutually perpendicular axes both perpendicular to the direction of displacement produced by the previously mentioned inputs. The tilt is regulated with reference to a fixed mirror of the system or the like by means of a signal derived from radiation passing through the optical system, by causing a slight rocking back and forth of the mirror first about one axis and then about the other and determining the magnitude and sign of the difference signal for each direction of tilt about the same axis and then adding the resulting correction to a bias voltage representing the desired tilt angle.

10 Claims, 3 Drawing Figures

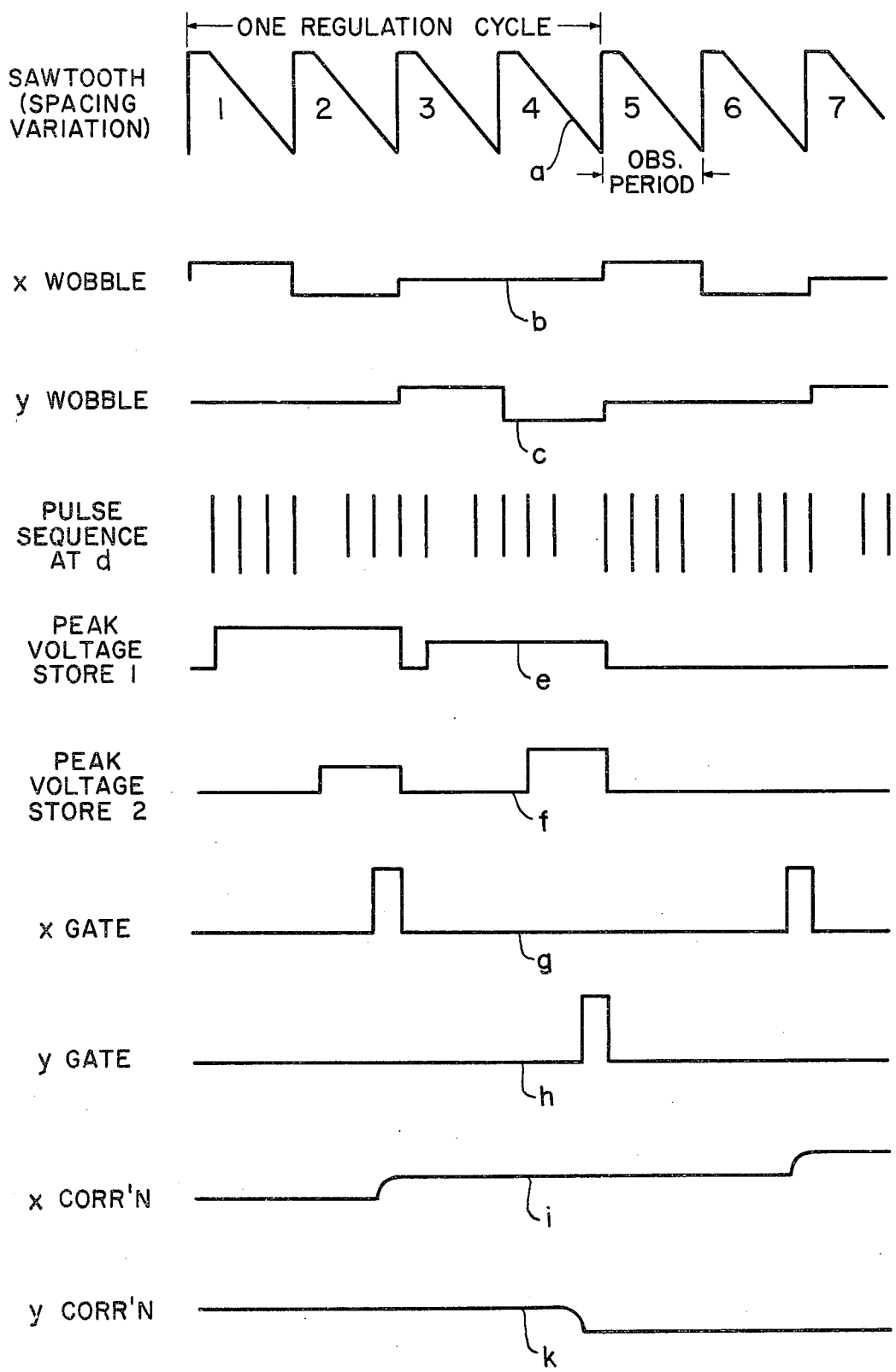

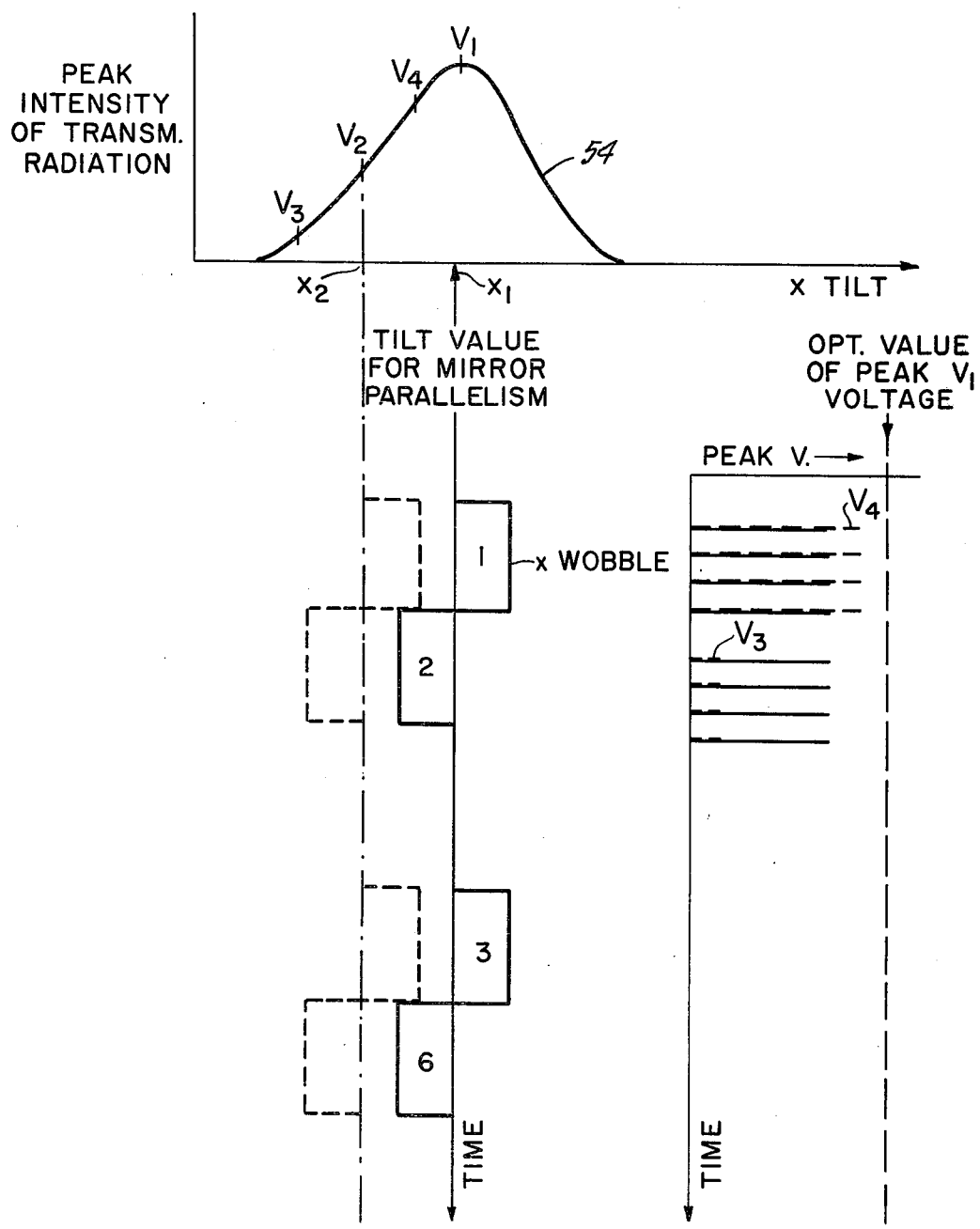

ELECTRONIC CONTROL AND REGULATION SYSTEM

This invention concerns an electronic control and regulation system for controlling and maintaining the spacing and parallelism of a pair of reflectors in an optical system, particularly such a control system suitable for the operation of a Fabry-Perot interferometer for investigation of Brillouin scatter radiation and the like.

BACKGROUND OF PRIOR ART

In the observation of Brillouin scatter with a Fabry-Pérot interferometer, it is known to scan the spectral region of interest of the scattered radiation by periodically shifting one of two mirrors with a piezoelectric mirror holder to change periodically the spacing of the two mirrors and at the same time to maintain the parallelism of the two mirrors by a control and regulation circuit operating on the holding device of the other of the two mirrors, as disclosed in Vol. 2, No. 2 of "Optics Communications", pp. 73 to 76 (July 1970). The control and regulation system for maintaining parallelism comprises two portions of which one operates on a first piezoelectric holder-displacing device to control the tilt of the mirror about an axis that may be referred to as the x axis and a second portion that operates on a second piezoelectric holder displacing device that controls the tilting of the same mirror about an axis perpendicular to the x axis, referred to as the y axis. The control signal is derived from the observed radiation to be measured coming out of the interferometer and is generated in such a way that during alternating brief periods determined by a timing circuit the mirror serving for control of parallelism is first checked and controlled with respect to one tilt axis and then similarly checked and controlled with respect to the other, in each case being swung very slightly back and forth about the axis in question in order to determine at what position the resulting intensity of a Rayleigh line is maximized in order to generate a positioning signal in the direction (of the sign) which will increase the line intensity.

In a control and regulation system of the kind above described both mirrors must be displaceable by piezoelectric adjusting devices or other devices of similar effect and, consequently, such a system is not suited for application to commercially available piezoelectrically adjustable interferometers in which only one of the usual pair of mirrors is provided with piezoelectric displacing devices and that one is only axially adjustable.

In another known control and regulation system for spacing and parallelism control of interferometer mirrors only one of the mirrors needs to be mounted on piezoelectric devices, that one being mounted on three piezoelectric devices. This known device operates by reference to sampling different points of the Rayleigh line and thus allows regulation of mirror parallelism only if at the same time the axial drift of the interferometer with reference to the light source wave length is regulated in coordination, which leads to a considerable narrowing of the control region for the parallelism regulation and/or for the duration of a measurement. Shifts of the interferometer transmission frequency with respect to the fundamental frequency of an incident beam produced by a laser, such frequency shifts resulting from temperature and air pressure fluctuations, require much greater adjustments for compensation than are necessary for the regulation of mirror parallelism, since the mirror parallelism is affected only by the differential changes produced by such forces as uneven thermal expansion, with respect to the three mirror support points.

It is an object of the present invention to provide an electronic control and regulation system for mirror spacing and parallelism in an optical system such as that of a Fabry-Pérot interferometer which will overcome the disadvantages described above.

SUMMARY OF THE INVENTION

Briefly, one of the reflectors of a pair of reflectors is mounted so as to be movable by three electrically displacing holding means arranged in a triangular configuration and both the reflector spacing control signals and the reflector tilt control signals are applied in electronically combined form to these three movable holding means. In the preferred arrangement the holding means are piezoelectric devices arranged in an equilateral triangle configuration and each is provided with a summing amplifier to supply an electric control signal to the piezoelectric element that is an additive combination of two or more signals supplied to the input of the respective summing amplifier by a matrix circuit, on the one hand, that suitably resolves the tile angle signals and by a sawtooth wave generator on the other hand that provides the spacing signals.

The invention is further described by way of example with reference to the annexed drawings, in which:

FIG. 2 is a graphical representation of the course with time of signals that appear at various places in the system of the invention during operation; and FIG. 3 is a diagram in the form of a kind of graph dealing with three dimensions of which one is time, for explaining the portion of the parallelism maintaining circuit that determines the direction of tilting produced.

Figure 1:
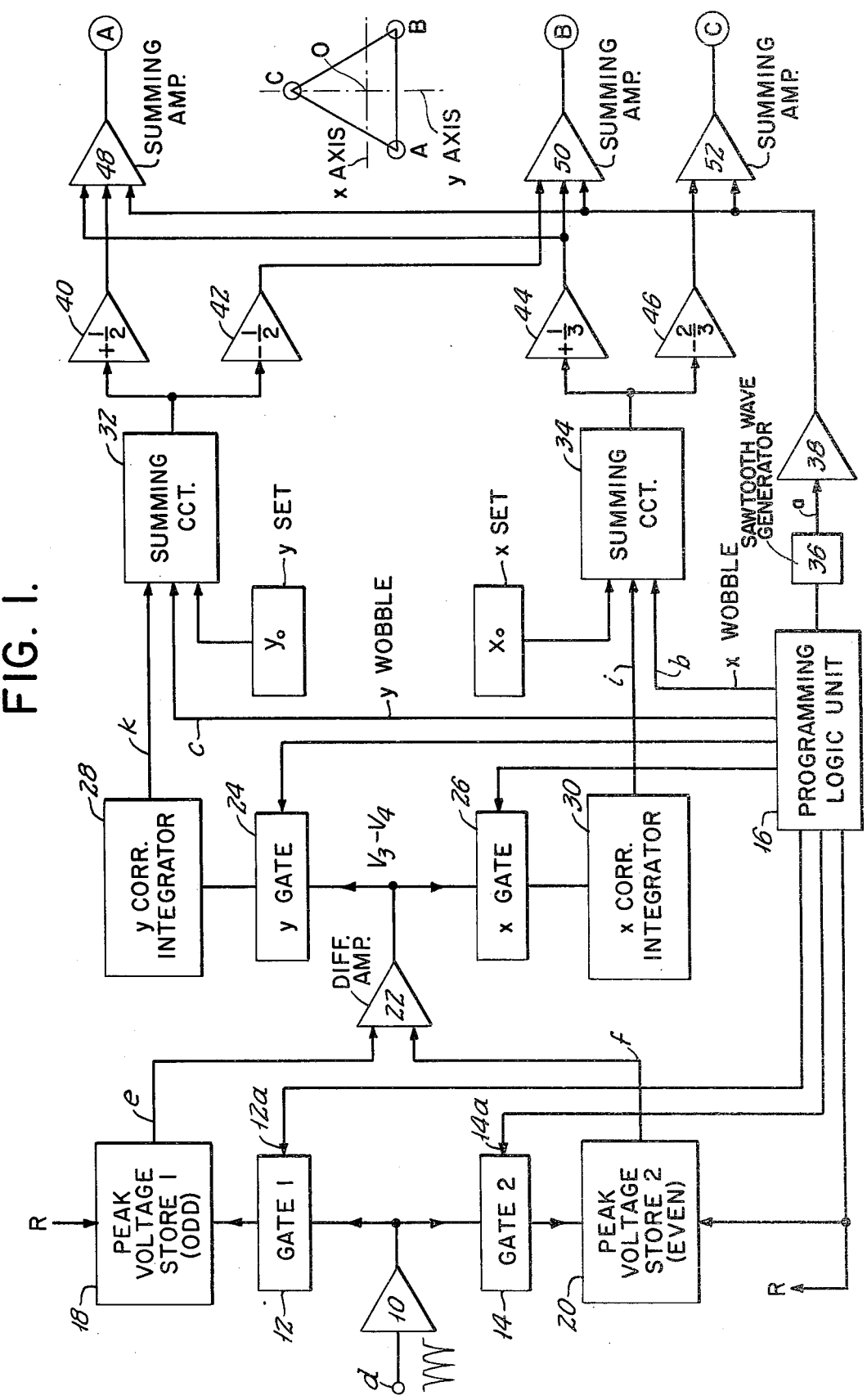
FIG. 1 is a block diagram of the circuit an electronic control and regulation system according to the invention.

The circuit shown by block diagram in FIG. 1 comprises an input amplifier 10 which receives a signal from the output of a photomultiplier not shown in the drawing that responds to an observed radiation to be measured that comes out of the interferometer.

The output signal of the input amplifier 10 is supplied to the respective signal inputs of two gate circuits 12 and 14 of which the respective control inputs 12a and 14a are connected to outputs of a control logic circuit or some other kind of programming unit represented by the block 16. The output signals of the gate circuits 12 and 14 are respectively connected to peak voltage storing circuits 18 and 20, the respective outputs of which are connected each to one of the two inputs of a differential amplifier 22. The output of the differential amplifier is supplied to the respective inputs of two more gate circuits 24 and 26, which, like the gate circuits 12 and 14 have their respective control inputs connected to outputs of the programming unit 16. The outputs of the gate circuits 24 and 26 are respectively connected to integrators 28 and 30, of which the outputs are in each case connected to one of the three inputs of tilt voltage summing circuit, the summing circuit 32 in the case of the integrator 28 and the summing circuit 34 in the case of the integrator 30. In the case of the integrator 32, the second input is a periodic displacement voltage (y wobble voltage) and its third input is a bias voltage (Yo) that determines the zero tilt position around the y axis. In the case of the x axis tilt voltage summing circuit 34, the second input is a periodic displacement voltage (x wobble voltage) and the third input is a x axis bias voltage ($x_o$).

The programming unit 16 provides, in addition to the x and y wobble voltages and the switching voltages for the gate circuit, also synchronization voltage for a sawtooth wave generator 36 that provides a substantially sawtooth form voltage wave that controls the displacement of one of the two reflectors of an optical equipment, for example one mirror of a Fabry-Pérot interferometer. The sawtooth voltage is amplified in an amplifier 38 to provide an amplified output.

The shiftable and tiltable reflector or mirror is diagrammatically represented in the upper right-hand portion of FIG. 1 to show the distribution of the three piezoelectric devices A, B and C by which the reflector can be moved, these devices providing for displacement of the respective three points which are vertices of an equilateral triangle, in each case in a direction along the optical axis o which runs perpendicular to the plane of the drawing. The tilt axis y is defined by the bisector of one of the angles of the triangle, for example the one at which the piezoelectric device C is located, in which case the x tilt axis is perpendicular to the y axis at the point of intersection of the three bisectors of the triangle vertices. The optical axis 0 also passes through that point of intersection.

In the illustrated example of the invention, both the axial shift of the reflector carried on the piezoelectric devices A, B and C and the tilting of this reflector about the x axis and about the y axis is produced by the piezoelectric devices A, B and C in response to the outputs of a matrix circuit that has as its input signals the output signals of the two tilt voltage summing circuits 32 and 34, and in simultaneous additive response to the output of the sawtooth wave amplifier 38. The matrix circuit comprises two amplifiers 40 and 42, utilizing as input the output of the y tilt voltage summing circuit 32, and two amplifiers 44 and 46, utilizing as input the output of the x tilt voltage summing circuit 34. The amplification factors of the amplifiers 40, 42, 44 and 46 are respectively $+\frac{1}{2}$, $-\frac{1}{2}$, $+\frac{1}{3}$ and $-\frac{2}{3}$ and of course their respective outputs are in each case their input multiplied by the amplification factor of the amplifier.

The outputs of the amplifier 40, 42, 44 and 46 and also the output of the sawtooth wave amplifier 38 are supplied to further summing circuits 48, 50 and 52 that may be regarded as the final stage of the matrix circuit, but for the purpose of the claims have been regarded as an input stage of the electrically driven holding means which include the respective piezoelectric devices A, B and C. The summing amplifier 48, which supplies a signal to operate the piezoelectric device A has a first input provided by the outputs of the amplifier 40, a second input provided by the output of the amplifier 44 and a third input provided by the output of amplifier 38. The summing amplifier 50, which provides a signal input to the piezoelectric device B has a first input provided by the output of the amplifier 42, a second input provided by the output of the amplifier 44 and a third input provided by the output of amplifier 38. The summing amplifier 52 which provides a signal to operate the piezoelectric device C has a first input provided by the output of the amplifier 46 and a second input provided by the output of amplifier 38.

It is therefore seen that one input of each of the amplifiers 48, 50 and 52 is connected with the output of the amplifier 38 to provide for reflector displacement along the optical axis in response to the sawtooth wave signals. It can also readily be seen that a voltage from the output of the y axis tilt summing circuit produces tilting of the reflector about the y axis, because the piezoelectric devices A, B are actuated in opposite directions while the piezoelectric device C remains unaffected and provides a quiescent pivot point for the tilt about the y axis. The voltage of the output of the x tilt voltage summing circuit 34 produces displacement in the same direction of the points of the mirror against which the piezoelectric devices A and B bear, by a certain amount, while the piezoelectric device C displaces the mirror by twice that amount in the opposite direction, because the spacing of the piezoelectric device C is twice as far from the axis as are the piezoelectric devices A and B. This movement produces a tilt about the x axis. The sawtooth voltage from the amplifier 38 actuates all three piezoelectric devices in the same direction, so that the mirror is thereby moved in the direction of the optical axis without change of parallellism to the other mirror.

Operation, with reference to FIG. 2: as follows. The sawtooth voltage shown by the top line of FIG. 2, designated a, determines the axial shift of the reflector and consequently the observation periods for the tilt control. For a complete regulation cycle four observation periods are required. During the first period the programming unit supplies to the x tilt voltage summing circuit 34 a tilt shift or x wobble value of a given magnitude at a first polarity, for example positive polarity, and during the second sawtooth period of the cycle a tilt shift value of the same prescribed magnitude and opposite sign is given to the same summing circuit 34. During the third and fourth sawtooth periods, which is to say during the second half of the regulation cycle, the x wobble value is equal to zero, as appears on the second line of the FIG. 2 which is designated b because the voltage appears at the point designated b in FIG. 1, just as the sawtooth voltage of line a appears at the point a of FIG. 1.

The fourth band of FIG. 2 is not a line but is a sequence of vertical lines representing the pulse sequence at the signal input d of the amplifier 10 of FIG. 1. These pulses have the greatest amplitude when the reflectors of the interferometer are exactly parallel. The dependence of the amplitude of the input pulses of the input amplifier 10 on the relative tilt of the reflectors about the x axis is represented by the curve 54 in FIG. 3. If for example the mirror has an angular position $x_2$ deviating from the precisely parallel position $x_1$, an amplitude responding to $V_2$ results which is smaller than the maximum possible amplitude $V_1$. The tilting of the mirror by the x deviation voltage then provides, for example, pulse amplitudes $V_3$ and $V_4$ in successive tilts. The gates 12 and 14 are alternately turned on, so that the peak voltage for storage circuits 18 and 20 store the respective amplitudes $V_3$ and $V_4$. The differential amplifier 22 forms the difference of these two amplitude values which is then supplied to the integrator 28 through the gate 24 which is turned on during the sawtooth periods 1 and 2 (as well as the periods 5 and 6 and, so on). The signals stored in the peak voltage storage circuits 18 and 20 are shown respectively on lines e and f of FIG. 2 and the control pulse for turning on the integrator 30 is shown on line g of FIG. 2.

The correction voltage generated by the integrator 30 is shown in line i of FIG. 2. When the angular position of the mirror corresponds to the optimum position x of 1, the signals stored in the peak voltage storage circuits 18 and 20 are of equal magnitude and no further tilting of the mirror is produced about the x axis.

The regulation of the mirror position with reference to the y axis is produced in exactly the same way during the sawtooth period 3 and 4 (and also 7 and 8, and so on). The y tilt shift or wobble voltage is shown in line c of FIG. 2. Line h of FIG. 2 shows the turn-on pulse for the gate 24 and line k of FIG. 2 shows the output voltage of the integrator 28.

The described embodiment of the invention can be varied or modified in many ways within the inventive concept. Thus, for example, instead of single piezoelectric devices A, B and C there could be used in each case two superposed piezoelectric devices and one device of each pair can be supplied with the voltage for varying the spacing between the mirrors supplied by the amplifier 38, while the other piezoelectric device of the pair receives the voltages provided by or derived from the outputs of one or more of the amplifiers 40 to 46 according to the scheme of FIG. 1. The voltage amplifiers 48 to 52 preferably comprise means for adjusting their amplification factor so as to make possible compensation for the sensitivity of the individual piezoelectric devices and these adjustments may be checked from time to time in case the sensitivity should vary with aging of these devices. Furthermore, for the displacement of the points corresponding to piezoelectric devices A and B in FIG. 1, three superposed piezoelectric devices can be used, making the summing amplifiers 48 and 50 unnecessary, with each one of each triplet of piezoelectric devices of being coupled to the output of the amplifiers 40, 42 and 44.

The piezoelectric devices or superposed groups of piezoelectric devices of course do not need to be arranged at the vertices of an equilateral triangle and other arrangements can be chosen instead if that should be convenient or desired. In such cases, of course, correspondingly different values for the amplification factor of the amplifier 40, 42, 44 and 46 will result, which can readily be calculated or graphically determined from the particular geometrical relations resulting from the choice of the disposition of the three points.

The invention has been described with reference to its application to a Fabry-Pérot interferometer. It can of course be used in a similar way for other interferometers and for other optical devices in which the angular position of an optical element with reference to an axis and also the location of the optical element along this axis are designed to be controllable and/or shiftable, for example in the case of optical resonators of a tunable laser, and the like.

We claim:

1. An electronic control and regulating system for controlling distance, and regulating parallelism of first and second reflectors spaced along an optical axis, said system comprising three electrically controllable support elements positioned in triangular configuration supporting at least one of said reflectors, first means for varying the distance of said first and second reflectors;

and second means for tilting one of said reflectors around first and second tilt axes forming angles significantly unequal to zero with each other and said optical axis, to maintain parallelism of said first and second reflectors, wherein said first and second means are connected to, and control the three support elements of the respective first and second reflectors.

2. System according to claim 1 wherein said triangular configuration is an equilateral triangle.

3. In an optical system having a pair of reflectors, an electric control and regulating system for controlling the spacing and parallelism of the reflectors of the pair comprising movable support means, movably supporting at least one of the reflectors;

a position control circuit (36,38) to control the position of the respective reflector along an optical axis;

and a tilt control circuit (12–34) to control the tilt position, and hence the parallel relation of a respective reflector with respect to the other of the pair by tilting the respective reflector about two mutually substantially perpendicular axes, which are further perpendicular to said optical axis wherein, in accordance with the invention the movable support means comprises three independently movable electrically controllable support elements (A, B, C) located in triangular configuration and conjointly supporting a respective reflector to provide both tilt and displacement movement to the respective reflectors;

the position control circuit (36,38) as well as the tilt control circuit (12–34) having their outputs connected to said three movable support elements of said respective reflector.

4. System as defined in claim 3 in which said tilt control circuit (12–34) provides a separate tilt signal for each of the respective two tilt axes, and in which, further, a matrix circuit (40–52) is provided receiving the respective signals and furnishing output signals respectively to said three support elements (A, B, C) in response to the tilt signals.

5. System as defined in claim 4 in which said three electrically displaceable support elements (A, B, C) are arranged in an equilateral triangle configuration and in which, further, said matrix circuit comprises a first amplifier with an amplification factor of $+\frac{1}{2}$, a second amplifier with an amplification factor of $-\frac{1}{2}$, a third amplifier with an amplification factor of $+\frac{1}{3}$ and a fourth amplifier with an amplification factor of $-\frac{2}{3}$, and in which, also, that one of said two separate signals provided by said tilt control circuit which refers to a first axis of said two mutually perpendicular axes is supplied to the respective inputs of said first and second amplifiers, that one of said two separate signals provided by said tilt control circuit which refers to the other of said two axes is supplied to the inputs of said third and fourth amplifiers, the outputs of said first and third amplifiers are connected to provide the corresponding output signals to a first of said three support elements (A) for control thereof, the output of said second and third amplifiers are connected to a second of said three support elements (B) for control thereof and the output of said fourth amplifier is connected to the third of said three support elements (C) for control thereof.

6. System as defined in claim 5 in which said position control circuit (36, 38) for controlling the spacing between said movably mounted reflector and the other reflector of said pair comprises means (16, 36) for generating sawtooth electrical waves, the output of which is supplied to each of said three support elements (A, B, C)

for control thereof, and in which, further, each of said three support elements (A, B, C) includes a summing amplifier (48, 50, 52) at its control input for providing an additive electrical control of the position of said respective holding means in response to the signals provided to the inputs of the respective holding means by said tilt control circuit (12-34) and by said sawtooth wave generating means (16, 36).

7. System according to claim 3 wherein said triangular configuration is an equilateral triangle.

8. In an optical system comprising fixed support means and first and second optical reflectors supported on said support means in spaced relationship along an optical axis, an electronic control and regulating arrangement for controlling the spacing and for maintaining parallelism of said first and second reflectors, said arrangement comprising first, second and third actuating means positioned in a triangular arrangement, each having spaced first and second ends and being controllable by an electrical signal to vary the spacing between its first and second ends, said first ends being connected to said support means, said second ends being connected to first, second and third respectively triangularly arranged locations, respectively, of said first reflector, said first and second locations defining a first tilt axis, said first and third locations defining a second tilt axis forming an angle significantly unequal to zero with said first tilt axis, and each of said tilt axes forming an angle significantly unequal to zero with said optical axis;

means for generating a spacing control signal;

coupling means for coupling said spacing control signal to each of said first, second and third actuators to vary the spacing between its first and second ends in the same sense and by essentially same amounts;

first means for generating a first regulating signal dependent on a first parallelism error angle in respect to said first tilt axis;

second means for generating a second regulating signal dependent on a second parallelism error in respect to said second tilt axis first coupling means to couple said first regulating signal to at least one of said first, second and third actuating means to reduce said first error angle; and second coupling means to couple said second regulating signal to at least one of said first, second and third actuating means to reduce said second error angle.

9. An electronic control and regulating arrangement as claimed in claim 8, wherein said first regulating signal is coupled to control said third actuating means and said second regulating signal is coupled to control said second means.

10. System according to claim 8 wherein said triangular configuration is an equilateral triangle.

* * * * *